(12) United States Patent
Lee et al.

(10) Patent No.: US 11,976,692 B1
(45) Date of Patent: May 7, 2024

(54) DISCONNECT CLUTCH ACTUATOR MECHANISM

(71) Applicant: Schaeffler Technologies AG & Co. KG, Herzogenaurach (DE)

(72) Inventors: Brian Lee, Charlotte, NC (US); Michael Hodge, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/368,565

(22) Filed: Sep. 14, 2023

(51) Int. Cl.
   *F16D 23/14* (2006.01)
   *F16H 63/32* (2006.01)
   *F16D 28/00* (2006.01)

(52) U.S. Cl.
   CPC ........ *F16D 23/14* (2013.01); *F16D 2023/141* (2013.01); *F16D 28/00* (2013.01); *F16D 2300/18* (2013.01); *F16D 2500/1023* (2013.01); *F16D 2500/10412* (2013.01)

(58) Field of Classification Search
   CPC .... F16D 23/14; F16D 2023/141; F16D 28/00; F16D 2300/18; F16D 2500/1023; F16D 2500/10412
   See application file for complete search history.

(56) References Cited

U.S. PATENT DOCUMENTS 6,001,041 A    12/1999  Sawase et al.
2021/0148413 A1*  5/2021  Eitzinger ................ F16D 11/14

FOREIGN PATENT DOCUMENTS

DE    102021200158 A1 *  7/2022

\* cited by examiner

*Primary Examiner* — David R Morris

(57) ABSTRACT

A disconnect clutch actuator mechanism includes a shift fork, an actuator, and a position sensor. The shift fork includes a rack gear, a pair of pins, and a sensor target. The shift fork is arranged to be pivotable on the pair of pins. The actuator includes a pinion gear engaged with the rack gear. The actuator is arranged to pivot the shift fork. The position sensor is arranged proximate the sensor target for sensing a pivot position of the shift fork. In some example embodiments, the rack gear includes a pair of arched portions and a toothed portion disposed on at least one of the pair of arched portions. The pinion gear is engaged with the toothed portion. In an example embodiment, the rack gear has a gap disposed between the pair of arched portions and the pinion gear is disposed in the gap.

15 Claims, 3 Drawing Sheets

DISCONNECT CLUTCH ACTUATOR MECHANISM

TECHNICAL FIELD

The present disclosure relates generally to an actuator, and more specifically to a disconnect clutch actuator mechanism.

BACKGROUND

Actuators are known. One example is shown and described in U.S. Pat. No. 6,001,041 titled POWER TRANSMISSION to Sawase et al.

SUMMARY

Example aspects broadly comprise a disconnect clutch actuator mechanism including a shift fork, an actuator, and a position sensor. The shift fork includes a rack gear, a pair of pins, and a sensor target. The shift fork is arranged to be pivotable on the pair of pins. The actuator includes a pinion gear engaged with the rack gear. The actuator is arranged to pivot the shift fork. The position sensor is arranged proximate the sensor target for sensing a pivot position of the shift fork. In some example embodiments, the rack gear includes a pair of arched portions and a toothed portion disposed on at least one of the pair of arched portions. The pinion gear is engaged with the toothed portion. In an example embodiment, the rack gear has a gap disposed between the pair of arched portions and the pinion gear is disposed in the gap.

In some example embodiments, the shift fork also includes a body portion connecting the pair of pins and a tab extending from the body portion. The rack gear and the sensor target are fixed to the tab. In an example embodiment, the rack gear and the sensor target are disposed on opposite sides of the tab. In an example embodiment, the rack gear and the sensor target are fixed to the tab by a fastener extending through the rack gear, the tab, and the sensor target.

In an example embodiment, the body portion has a generally arched shape. In some example embodiment, the shift fork also includes a pair of legs extending from opposite distal ends of the body portion. In an example embodiment, the disconnect clutch actuator mechanism also includes a pair of engagement tabs. Each of the pair of legs has a respective aperture and each of the pair of engagement tabs has a protrusion pivotably arranged in one of the respective apertures. In an example embodiment, each of the pair of engagement tabs is arranged to displace an actuator ring when the shift fork is pivoted by the actuator.

In some example embodiments, the actuator also includes an electric motor and a gear train for rotating the pinion gear. In an example embodiment, the actuator also includes a housing and a plurality of bearings disposed in the housing for supporting the gear train. In some example embodiments, the position sensor is fixed to the housing. In an example embodiment, the housing has an aperture and the position sensor extends through the aperture. In an example embodiment, the position sensor includes a connector end for connecting to an electrical harness.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 2:
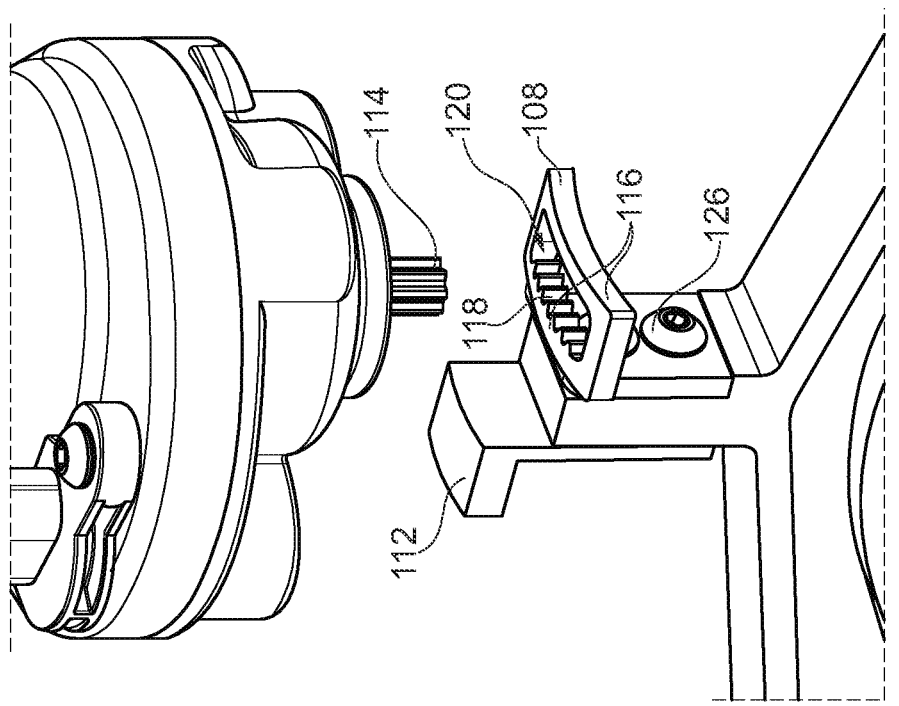
FIG. 2 illustrates a partial exploded perspective view of the disconnect clutch actuator mechanism of FIG. 1.
Figure 1:
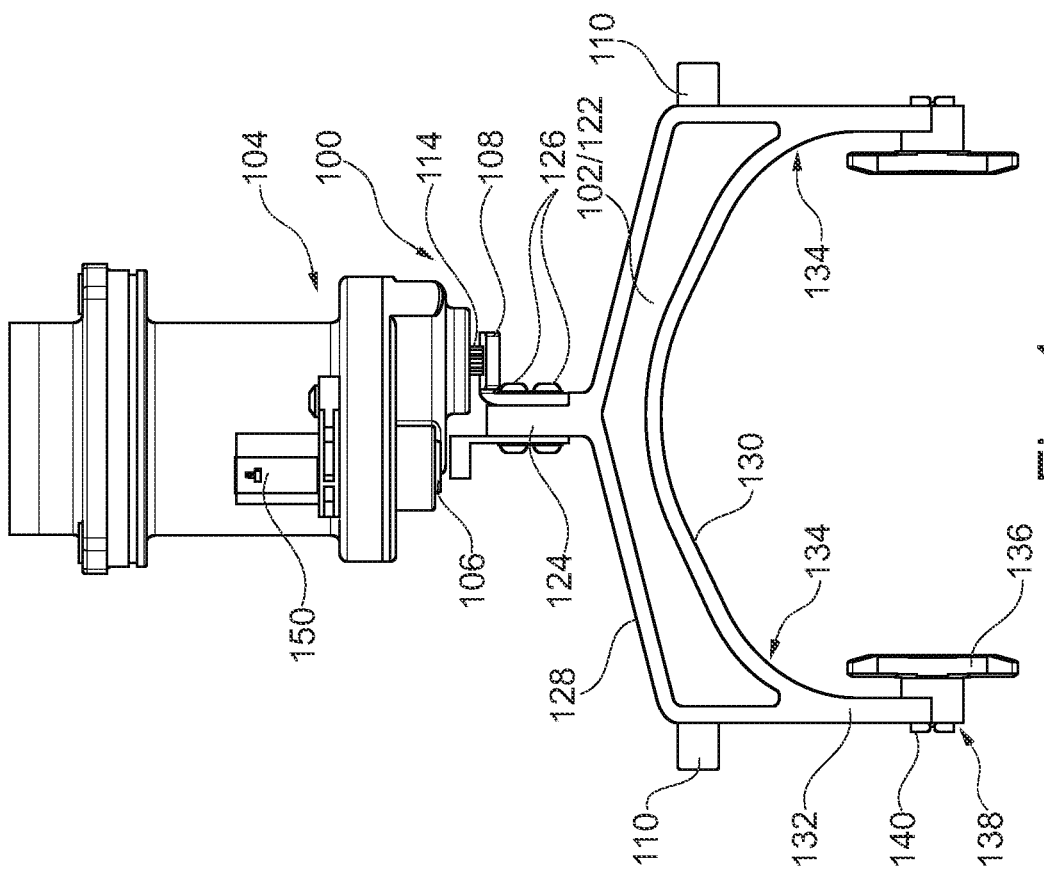
FIG. 1 illustrates front view of a disconnect clutch actuator mechanism according to an example aspect of the present disclosure.

The following description is made with reference to FIGS. 1-2. FIG. 1 illustrates front view of disconnect clutch actuator mechanism 100. FIG. 2 illustrates a partial exploded perspective view of disconnect clutch actuator mechanism 100 of FIG. 1. Disconnect clutch actuator mechanism 100 includes shift fork 102, actuator 104 and position sensor 106. The shift fork includes rack gear 108, pins 110, and sensor target 112. Shift fork 102 is arranged to be pivotable on pins 110 as described in more detail below. Actuator 104 includes pinion gear 114 engaged with the rack gear. Actuator 104 is arranged to pivot the shift fork as described in more detail below. Position sensor 106 is arranged proximate the sensor target for sensing a pivot position of the shift fork as described in more detail below.

Rack gear 108 includes arched portions 116 and toothed portion 118. It should be noted that one or both of arched portions 116 may include a toothed portion 118. The pinion gear is engaged with the toothed portion. That is, because the rack gear is disposed on the shift fork and the shift fork pivots, the toothed portion is arranged in an arc to maintain engagement with the pinion as the shift fork pivots. The pinion gear has a mating tooth profile that matches the toothed portion of the rack gear so that, as the pinion gear rotates, the rack gear is displaced into or out of the page as shown in FIG. 1. Rack gear 108 includes gap 120 disposed between the pair of arched portions and the pinion gear is disposed in the gap.

Shift fork 102 includes body portion 122 connecting pins 110 and tab 124 extending from the body portion. The rack gear and the sensor target are fixed to the tab. The rack gear and the sensor target are disposed on opposite sides of the tab and fixed to the tab by fastener 126 extending through the rack gear, the tab, and the sensor target.

Body portion 122 has a generally arched shape. As can be seen in FIG. 1, for example, body portion 122 includes angled top surfaces 128 and rounded lower surfaces 130 that form an arch. Although body portion 122 is shown generally as an arch, the body portion may be formed differently in other embodiments. For example, top surfaces 128 may be rounded and lower surfaces 130 may be angled. Shift fork 102 also includes legs 132 extending from opposite distal ends 134 of the body portion. In an example embodiment (not shown), the body portion may be formed with straight top and/or bottom surfaces extending perpendicular to legs 132.

Figure 4:
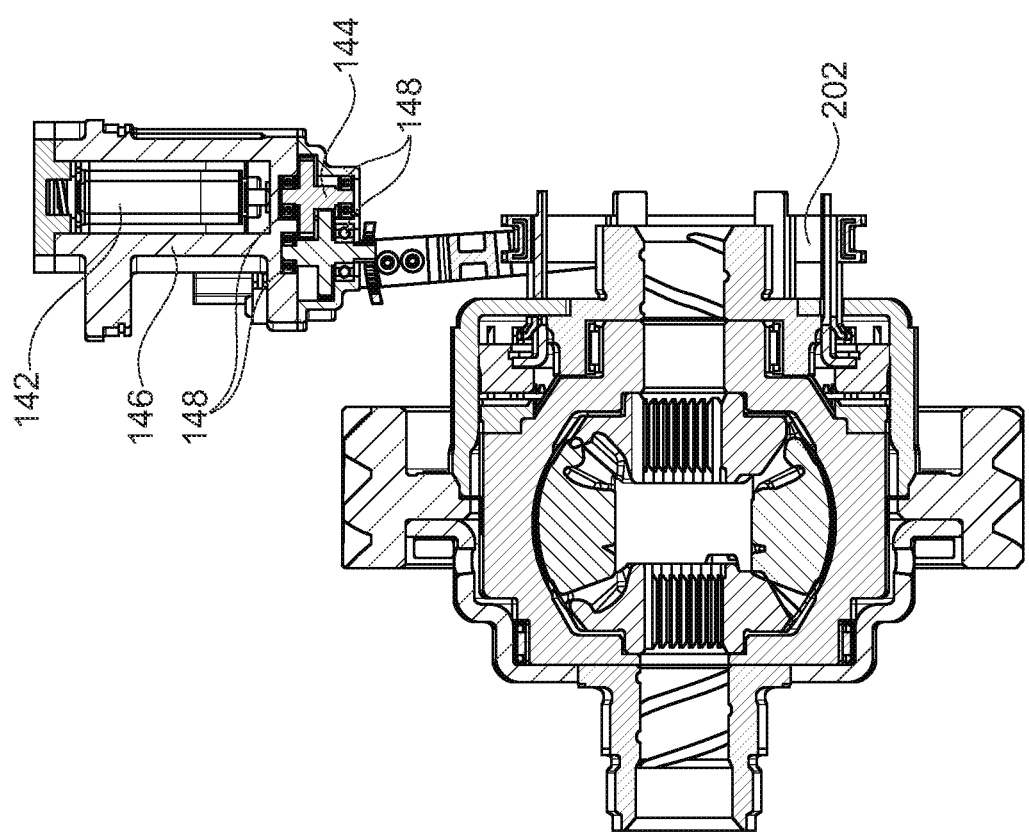
FIG. 4 illustrates a cross-sectional view of the disconnect clutch actuator mechanism of FIG. 3.
Figure 3:
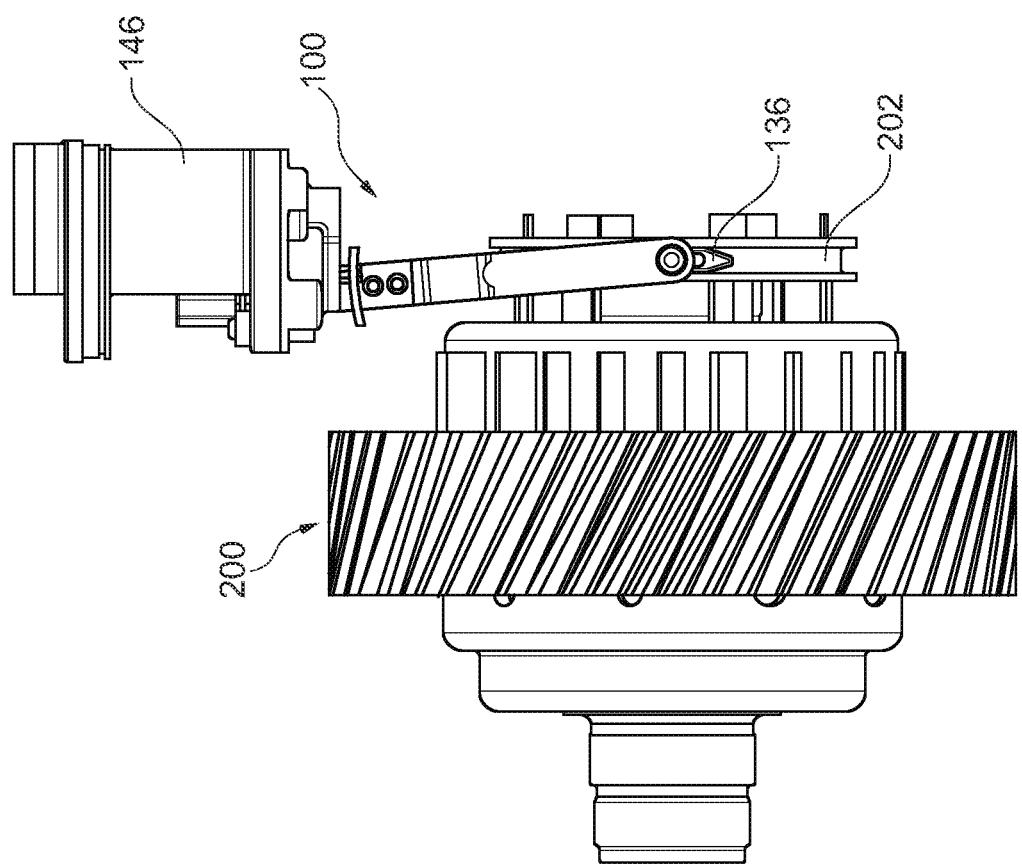
FIG. 3 illustrates a side view of the disconnect clutch actuator mechanism of FIG. 1 shown engaged with a differential.
Figure 5:
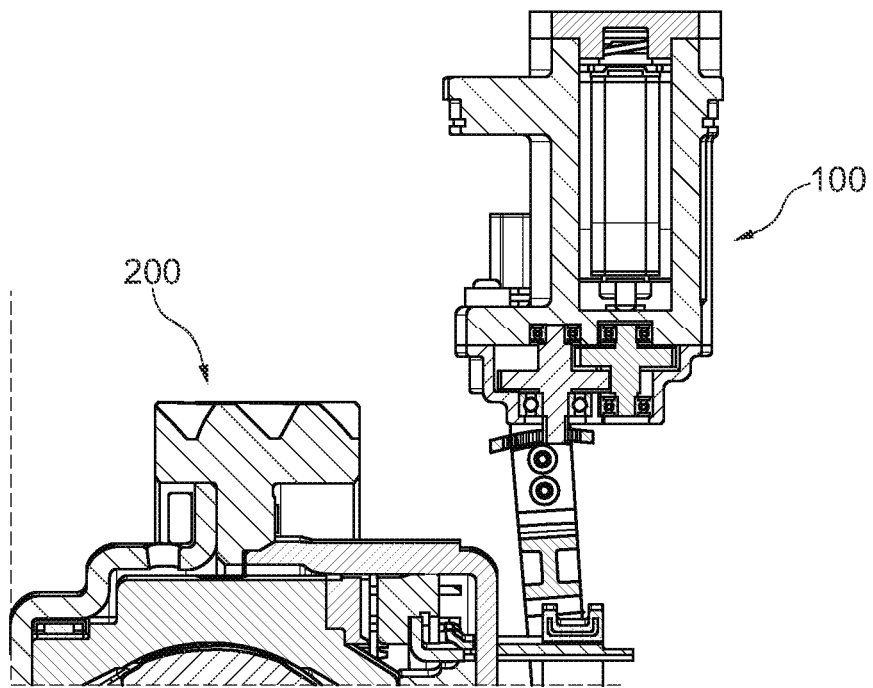
FIG. 5 illustrates a partial cross-sectional view of the disconnect clutch actuator mechanism of FIG. 3 shown in a disengaged position.
Figure 6:
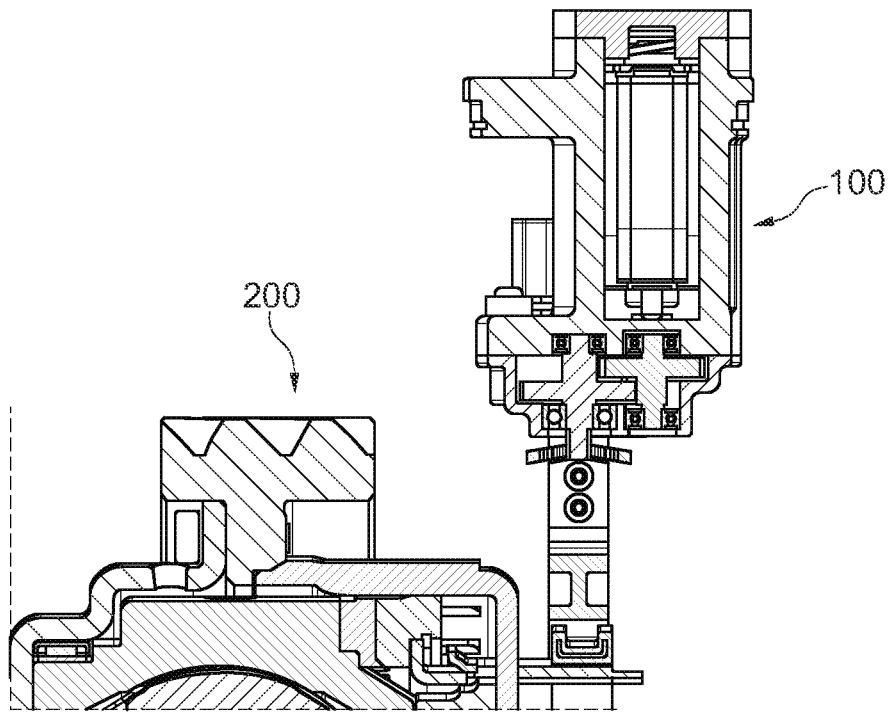
FIG. 6 illustrates a partial cross-sectional view of the disconnect clutch actuator mechanism of FIG. 3 shown in an engaged position.

The following description is made with reference to FIGS. 1-6. FIG. 3 illustrates a side view of disconnect clutch actuator mechanism 100 of FIG. 1 shown engaged with differential 200. FIG. 4 illustrates a cross-sectional view of disconnect clutch actuator mechanism 100 of FIG. 3. FIG. 5 illustrates a partial cross-sectional view of disconnect clutch actuator mechanism 100 of FIG. 3 shown in a disengaged position. FIG. 6 illustrates a partial cross-sectional view of disconnect clutch actuator mechanism 100 of FIG. 3 shown in an engaged position.

Disconnect clutch actuator mechanism 100 also includes engagement tabs 136. Each of legs 132 includes an aperture 138 and each of engagement tabs 136 includes a protrusion 140 pivotably arranged in one of apertures 138. Tabs 136 may be formed from plastic and protrusions 140 may "snap" into apertures 138. Each of the pair of engagement tabs is arranged to displace actuator ring 202 when the shift fork is pivoted by the actuator. Operation of differential 200 and actuator 202 is similar to the differential unit and shift sleeve shown and described in commonly-assigned U.S. patent application Ser. No. 18/209,478 titled DIFFERENTIAL DISCONNECT SYSTEM to Lee et al., hereby incorporated by reference as if set forth fully herein.

Actuator 104 includes electric motor 142 and gear train 144 for rotating pinion gear 114. That is, a rotational speed of motor 142 is adjusted by gear train 144 so that, in the example embodiment shown, the pinion gear rotates on an axis offset from and parallel to an axis of the electric motor. Actuator 104 also includes housing 146 and bearings 148 disposed in the housing for supporting the gear train. Position sensor 106 is fixed to the housing. That is, housing 146 includes an aperture and the position sensor extends through the aperture. Position sensor 106 includes connector end 150 for connecting to an electrical harness. The electrical harness may be connected with a processing unit for adjusting a current to electric motor 142 based on a detected pivot position of the shift fork.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Disconnect clutch actuator mechanism
102 Shift fork
104 Actuator
106 Position sensor
108 Rack gear
110 Pins (pair on shift fork)
112 Sensor target
114 Pinion gear
116 Arched portions (rack gear)
118 Toothed portions (rack gear)
120 Gap
122 Body portion (shift fork)
124 Tab (shift fork)
126 Fastener
128 Top surfaces (body portion)
130 Lower surfaces (body portion)
132 Legs (shift fork)
134 Distal ends (body portion)
136 Engagement tabs
138 Aperture (leg)
140 Protrusion (engagement tabs)
142 Electric motor
144 Gear train
146 Housing
148 Bearings
150 Connector end (position sensor)
200 Differential
202 Actuator ring

What is claimed is:

1. A disconnect clutch actuator mechanism, comprising:
   a shift fork comprising:
      a rack gear; and
      a pair of pins, the shift fork arranged to be pivotable on the pair of pins; and
      a sensor target;
   an actuator:
      comprising a pinion gear engaged with the rack gear; and
      arranged to pivot the shift fork; and
   a position sensor arranged proximate the sensor target for sensing a pivot position of the shift fork.

2. The disconnect clutch actuator mechanism of claim 1 wherein:

the rack gear comprises:
  a pair of arched portions; and
  a toothed portion disposed on at least one of the pair of arched portions; and
the pinion gear is engaged with the toothed portion.

3. The disconnect clutch actuator mechanism of claim 2 wherein:
the rack gear comprises a gap disposed between the pair of arched portions; and
the pinion gear is disposed in the gap.

4. The disconnect clutch actuator mechanism of claim 1 wherein:
the shift fork further comprises:
  a body portion connecting the pair of pins; and
  a tab extending from the body portion; and
the rack gear and the sensor target are fixed to the tab.

5. The disconnect clutch actuator mechanism of claim 4 wherein the rack gear and the sensor target are disposed on opposite sides of the tab.

6. The disconnect clutch actuator mechanism of claim 4 wherein the rack gear and the sensor target are fixed to the tab by a fastener extending through the rack gear, the tab, and the sensor target.

7. The disconnect clutch actuator mechanism of claim 4 wherein the body portion has a generally arched shape.

8. The disconnect clutch actuator mechanism of claim 4 wherein the shift fork further comprises a pair of legs extending from opposite distal ends of the body portion.

9. The disconnect clutch actuator mechanism of claim 8 further comprising a pair of engagement tabs, wherein:
each of the pair of legs comprises a respective aperture; and
each of the pair of engagement tabs comprises a protrusion pivotably arranged in one of the respective apertures.

10. The disconnect clutch actuator mechanism of claim 8 wherein each of the pair of engagement tabs is arranged to displace an actuator ring when the shift fork is pivoted by the actuator.

11. The disconnect clutch actuator mechanism of claim 1 wherein the actuator further comprises an electric motor and a gear train for rotating the pinion gear.

12. The disconnect clutch actuator mechanism of claim 11 wherein the actuator further comprises a housing and a plurality of bearings disposed in the housing for supporting the gear train.

13. The disconnect clutch actuator mechanism of claim 1 wherein:
the actuator further comprises a housing; and
the position sensor is fixed to the housing.

14. The disconnect clutch actuator mechanism of claim 13 wherein:
the housing comprises an aperture; and
the position sensor extends through the aperture.

15. The disconnect clutch actuator mechanism of claim 1 wherein the position sensor comprises a connector end for connecting to an electrical harness.

* * * * *